(12) United States Patent
Ogden

(10) Patent No.: US 9,598,858 B2
(45) Date of Patent: Mar. 21, 2017

(54) THERMAL INSULATION PANEL
(71) Applicant: OXFORD BROOKES UNIVERSITY, Oxford (GB)
(72) Inventor: Raymond Ogden, Wallingford (GB)
(73) Assignee: OXFORD BROOKES UNVIERSITY, Oxford (GB)
( * ) Notice: Subject to any disclaimer, the term of this patent is extended or adjusted under 35 U.S.C. 154(b) by 0 days.
(21) Appl. No.: 14/651,486
(22) PCT Filed: Dec. 12, 2013
(86) PCT No.: PCT/GB2013/053273
§ 371 (c)(1),
(2) Date: Jun. 11, 2015
(87) PCT Pub. No.: WO2014/091234
PCT Pub. Date: Jun. 19, 2014

(65) Prior Publication Data
US 2015/0330071 A1    Nov. 19, 2015

(30) Foreign Application Priority Data
Dec. 13, 2012 (GB) .................... 1222524.9

(51) Int. Cl.
| | | |
|---|---|---|
| *F16L 59/065* | (2006.01) | |
| *E04B 1/80* | (2006.01) | |
| *B32B 3/08* | (2006.01) | |
| *B32B 3/28* | (2006.01) | |
| *E04H 15/20* | (2006.01) | |

(52) U.S. Cl.
CPC ............... *E04B 1/803* (2013.01); *B32B 3/08* (2013.01); *B32B 3/28* (2013.01); *E04B 1/80* (2013.01);
(Continued)

(58) Field of Classification Search
CPC ... Y10T 428/231; E04B 1/803; E06B 3/6612; Y02B 80/12
(Continued)

(56) References Cited

U.S. PATENT DOCUMENTS 2,638,187 A * 5/1953 Tate ........................ E04B 1/803
  52/792.1
4,304,824 A * 12/1981 Karpinski ................ B32B 5/30
  428/157
(Continued)

FOREIGN PATENT DOCUMENTS

| CN | 201660977 U | 12/2010 |
| DE | 2349401 A1 | 4/1975 |

(Continued)

OTHER PUBLICATIONS

International Preliminary Report on Patentability, issued Jun. 16, 2015, received in connection with International Application No. PCT/GB2013/053273.
(Continued)

*Primary Examiner* — Alexander Thomas
(74) *Attorney, Agent, or Firm* — Meunier Carlin & Curfman LLC

(57) ABSTRACT

The present invention provides a thermal insulation panel (10) having two outer concaved layers (14, 16) and an inner tension (24) member formed by two substantially parallel panels (26,28). The peripheries of the layers and panels are secured to a thermal barrier (22) extending around the periphery of the panel (10) and a vacuum seal (25) seals the edge. In operation, a partial vacuum is created within the panel which causes concaved layers (14, 16) to flatten and tension panels (26, 28) to be placed under tension. This tensional loading creates a strong and rigid structure without the need for internal supports which can create thermal inefficiency.

13 Claims, 4 Drawing Sheets

(52) U.S. Cl.
CPC ....... *F16L 59/065* (2013.01); *B32B 2307/304* (2013.01); *B32B 2307/306* (2013.01); *B32B 2419/04* (2013.01); *E04H 2015/203* (2013.01); *Y02B 80/12* (2013.01); *Y10T 29/49828* (2015.01); *Y10T 428/231* (2015.01)

(58) Field of Classification Search
USPC .......................................................... 428/69
See application file for complete search history.

(56) References Cited

U.S. PATENT DOCUMENTS

| | | | |
|---|---|---|---|
| 4,317,854 | A | 3/1982 | Rathmell |
| 8,221,857 | B2 * | 7/2012 | Jaeger ................... E06B 3/6612 156/109 |
| 2007/0286971 | A1 | 12/2007 | Cooper et al. |
| 2007/0286981 | A1 | 12/2007 | Feinerman |

FOREIGN PATENT DOCUMENTS

| | | |
|---|---|---|
| DE | 102010025784 A1 | 1/2012 |
| EP | 1752600 A1 | 2/2007 |
| EP | 2055837 A1 | 5/2009 |
| GB | 2446053 A | 7/2008 |
| JP | 2003044054 | 2/2003 |
| JP | 2003166298 | 6/2003 |
| WO | 2007074503 A1 | 7/2007 |

OTHER PUBLICATIONS

Great Britain Intellectual Property Office Search Report for Great Britian Application No. GB1222524.9, dated Jun. 21, 2013.
Written Opinion of the International Searching Authority in International Application No. PCT/GB2013/053273, Apr. 2014.
International Search Report in International Application No. PCT/GB2013/053273, mailed Mar. 4, 2014.

* cited by examiner

THERMAL INSULATION PANEL

The present invention relates to a thermal insulation panel and relates particularly but not exclusively to an insulation panel for use in the external cladding of buildings.

It is well known that to improve the thermal efficiency of a building it is desirable to improve the insulation applied thereto and it is also known that additional insulation may be applied to either the internal or external surfaces of a building either during or after construction. Such insulation includes but is not limited to expanded foam materials and the like encased in a supporting matrix of envelope, fibrous materials which may be sandwiched between the building wall and an over-coating of protective material such as wood and vacuum insulation panels. The latter type is often designed to be incorporated into the design of new buildings such that standard size panels can be fitted into standard sized openings created during construction.

JP 2003-44054 discloses a sound insulation panel comprising in one embodiment a generally flexible outer envelope comprising two concaved panels which are joined along their outer peripheries and spaced at their mid-points by means of a spacer which keeps the outer panels apart when a partial vacuum is created therebetween. In one arrangement a spacer bar is provided along with corner strengtheners in an attempt to provide a greater degree of rigidity. Such spacers tend to act as heat transfer mechanisms and are, therefore, undesirable.

JP 2003-166298 discloses a further sound insulation panel comprising two sound insulating boards having an inner space therebetween which is subjected to a partial vacuum. The insulation panels are kept apart by means of a matrix of spacers which significantly compromises the insulation capabilities of the vacuum.

WO 2007/074503 discloses a vacuum sound insulation panel with tension members which are used to damp sound energy that the outer panels are exposed to. To do this they are specifically engaged with the panels at points across their width which are each extensions of the panel in question. Consequently, the tension members are specifically in contact with the outer skin and will act to transmit thermal energy.

CN 201660977 is also a vacuum insulation panel having outer panels and a vacuum point as well as a rigid supporting structure formed of two layers which has elements that contact the outer skins but is used to space the skins apart and maintain them apart when a vacuum is created, thus avoiding panel collapse when vacuum is applied. Such an arrangement will provide a relatively significant thermal path between the outer panels. The rigid support structure does not appear to be connected to the periphery of the outer panels.

There therefore exists a requirement to provide an insulation panel arrangement which provides a higher degree of thermal insulation whilst maintaining a relatively low thickness such as to allow a good degree of insulation to be provided whilst not adversely affecting the overall wall thickness.

Accordingly, the present invention provides: a thermal insulation panel comprising: an outer casing having a first outer layer and a second outer layer and each having an outer periphery; a thermal insulation barrier extending around an outer periphery between the first and the second outer layers; a vacuum seal joining the outer periphery of said first outer layer and the outer periphery of said second outer layer; a vacuum outlet; a vacuum outlet valve; and a tension member comprising a pair of tension panels between said outer layers said first tension panel extending between and being joined to the first outer layer at the periphery thereof and the second tension panel extending between and being joined to the second outer layer at the periphery thereof.

Preferably, each of said first and second outer layers are curved having a concaved surface on an inner side thereof.

Each of said first and second tension panels may comprise sheets and include outer peripheries and wherein said outer peripheries are joined to adjacent peripheries of said first and second outer layers respectively.

Preferably, said tension panels include outwardly facing surfaces and inwardly facing surfaces and wherein said inwardly facing surfaces include a heat reflective surface. Alternatively or in addition one or more of said outwardly facing surfaces of the tension panels include a heat reflective surface.

Advantageously, the outwardly facing surfaces of one or more of the first and second outer layers includes a heat reflective surface.

Advantageously, said vacuum seal comprises a metal foil. In one arrangement said vacuum seal is joined to each of said first and second layers by a weld. Alternatively, said vacuum seal is joined to each of said first and second layers by an adhesive bond.

Said insulation barrier may comprise a number of materials but is preferably selected from the materials: plastic, ceramic, rubber or wood.

In an alternative arrangement of the present invention said first and second outer layers are joined to respective tension panels at a plurality of locations across a width of said panel, thereby to form a plurality of discrete pockets. This arrangement may also include a plurality of external ribs, each rib being joined to said outer layer along a length thereof at each of said locations at which said outer layers are joined to said tension panels. Preferably, said ribs (50) are convex along their length.

Advantageously, the first and second outer layers of each of the above arrangements are each joined to respective tension panels around the entire outer periphery thereof.

The present invention also provides a method of manufacturing an insulation panel as described above comprising the steps of:
  a) providing an outer casing having a first outer layer and a second outer layer and each having an outer periphery;
  b) providing an insulation barrier extending around an outer periphery between the first and the second outer layers;
  c) providing a vacuum seal joining the outer periphery of said first outer layer and the outer periphery of said second outer layer and sealing said seal to said layers;
  d) providing a vacuum outlet;
  e) providing a vacuum outlet valve;
  f) providing a tension member comprising a pair of tension panels between said outer layers, said first tension panel extending between and being joined to the first outer layer at the periphery thereof and the second tension panel extending between and being joined to the second outer layer at the periphery thereof;
  g) creating a partial vacuum within the panel by withdrawing gas from within said panel such as to cause the concaved outer layers to at least partially flatten thereby to move towards the tension member and cause said tension member to be stretched and placed under tension; and h) sealing the outlet such as to capture the partial vacuum within the panel and maintain said tension member in tension.

The present invention will now be more particularly described by way of example only with reference to the accompanying drawings, in which.

Figure 1:
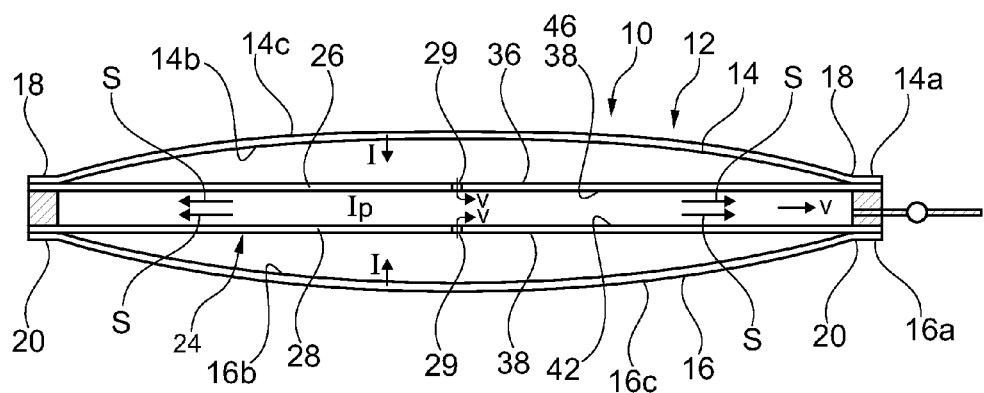
FIG. 1 is a cross-sectional view of a thermal insulation panel according to aspects of the present invention.

Referring now to the drawings in general but particularly to FIGS. 1 to 4, the thermal insulation panel 10 of the present invention includes an outer casing 12 having a first outer layer 14 and a second outer layer 16 and each having an outer periphery 18, 20 and an insulation barrier 22 between the first and the second outer layers 14, 16. The insulation barrier 22 extending solely around the outer periphery thereof 14a, 16a and forms a peripheral support frame without extending inwardly thereof. It is highlighted that the width $P_W$ of the insulation barrier is kept to a minimum such that it does not extend excessively or at all into the inner portion $I_P$ of the barrier area between the periphery, thus avoiding or at least reducing the possibility of thermal energy being transmitted therethrough in an area $I_P$ between the outer peripheries of the outer layers 14a, 16a of the panel 10. In the preferred arrangement the insulation barrier is confined to the periphery itself and indeed may form the outer periphery. Each of said first and second outer layers are curved having a concaved surface on an inner side (14a, 16a) thereof, the function of which will be appreciated later herein. A vacuum seal 25 joins the outer periphery 18 of said first outer layer 14 and the outer periphery 20 of said second outer layer 16 and is best seen with reference to FIG. 2. A vacuum outlet 30 is provided through the insulation barrier 22 and further provided with a sealing valve shown diagrammatically at 31, both of which are used in the establishment and maintenance of a partial vacuum within the panel 10 as will be described later herein. A tension member 24 comprising a pair of tension panels 26, 28 having outer peripheries 32, 34 are positioned in a generally parallel relationship to each other between said outer layers 14, 18. Said first tension panel 26 extends between and is joined to the first outer layer 14 at the periphery 14a thereof whilst the second tension panel 28 extends between and is joined to the second outer layer 16 at the periphery 16a thereof. Joining may be by means of an adhesive or mechanical inter-engagement or by welding, as discussed later herein. The tension panels 26, 28 are spaced from each other by the insulation barrier 22. One or more vacuum holes 29 are provided in each panel 26, 28 for reasons that will become apparent later herein. Said first and second outer layers 14, 16 are each joined to respective tension panels 26, 28 around the entire outer periphery thereof.

Each of panels 26, 28 include both inner and outer surfaces 36, 38, 40 and 42 and one or more of which may comprise a reflective surface such as a mirrored surface for the reflection of heat radiation. In one example, both the inner 40, 42 surfaces of panels have such a reflective surface such as to reflect thermal radiation therebetween. In another arrangement, the outer surfaces 36, 38 have such a reflective surface such as to reflect thermal radiation before it passes into the void or chamber 60 between said tension panels. It will be appreciated that any one or more or a combination of said surfaces may be provided with such a reflective surface as and when desired.

Figure 2:
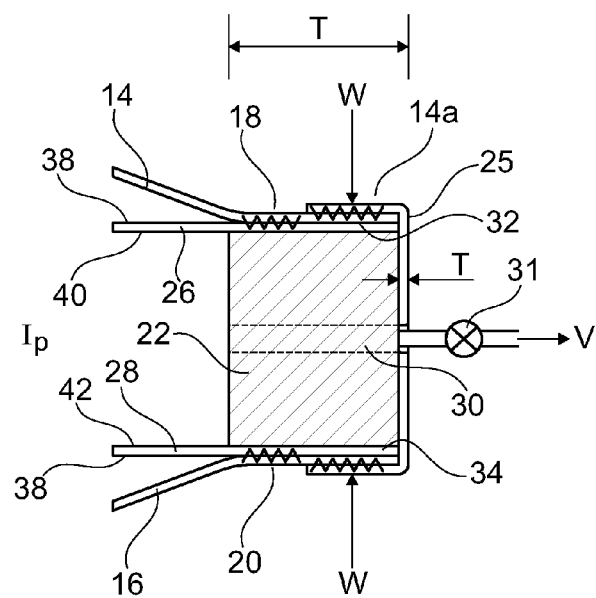
FIG. 2 is a detailed cross-sectional view of the edge portion of the panel shown in FIG. 1.

Referring now more particularly to FIG. 2, from which it will be seen that the vacuum seal 25 comprises a cover which extends between the two outer peripheries 18, 20 and around the entire circumference of the panel 10 such as to bridge any gap therebetween. The seal 25 may be of any number of materials such as metal, plastic or rubber so long as it can be bonded or otherwise joined to the outer panels 14, 16 in a manner that creates an airtight seal therebetween. Examples of joining methods include adhesive bonding wherein an adhesive 50 is placed between the contacting surfaces 52, 54 of the seal and inner/outer layers (along the zig-zag line of FIG. 2). Another example may include welding of the adjacent portions. Welding may take the form of electron beam welding and may be done in the direction of arrows W in FIG. 2. If welding is employed the weld may be created in an atmosphere of partial vacuum which may also be the same partial vacuum as is used to partially evacuate the interior of the panel itself 10. The thermal insulation barrier 22 is positioned between confronting peripheries 18, 20 and acts to space them apart but also reduce any thermal transfer therebetween. As such, the barrier 22 needs to be of a thermally insulating or have a low heat transfer characteristic. As the barrier 22 is subjected to a partial vacuum on an inner surface thereof it needs to have some strength but this need not be high as the outer layers 14, 16 will carry much of any load and provide the necessary rigidity in combination with the desired strength. The reader will also appreciate that most of the load experienced by the thermal barrier is compressive load and many highly insulating materials are sufficiently strong to accommodate the load placed on them in the above arrangement. In addition, the panels 14, 16 and tension member 24 each provide a good degree of structural strength which supports the thermal barrier 22. Also shown in detail in FIG. 2 is the vacuum outlet 30 and valve 31 the operation of which will be described later herein.

The reader will appreciate that there is a requirement to reduce the thermal transmission across the panel 10 and this is done at least in part by the use of a partial vacuum and partially by the use of the thermal insulation barrier 22. The vacuum seal 24 bridges the gap between the panels 14, 16 and, therefore, has the potential to also bridge the thermal barrier 22 and heat may be transferred therethrough from one side of the panel to the other. However, it will be appreciated that this heat transfer is kept to an absolute minimum by reducing the thickness T of seal 22 to a minimum and/or using materials with low thermal transfer characteristics. A thin metal film would not have a great degree of cross-sectional area available for adverse heat transfer but would make an excellent vacuum seal once bonded or otherwise joined to the outer layers 14, 16. This metal film may be replaced by a plastic film or other such material which would have an even lower thermal transfer capability but would still be able to both seal the arrangement and bond to the panels whilst maintaining a good vacuum seal. The thermal barrier may be made of plastic (including UPVC), ceramic, rubber or wood and may be wrapped in an outer skin (not shown) of plastic or metal, as desired. Further, it will be appreciated that when tension members 26, 28 are provided in the form of sheet material the surfaces may be coated with heat reflective materials, thus further enhancing the thermal insulation properties of the product as any heat that does enter the interior $I_P$ may be reflected internally rather than transmitted through the structure. Other materials and methods will present themselves to those skilled in the art.

Figure 3:
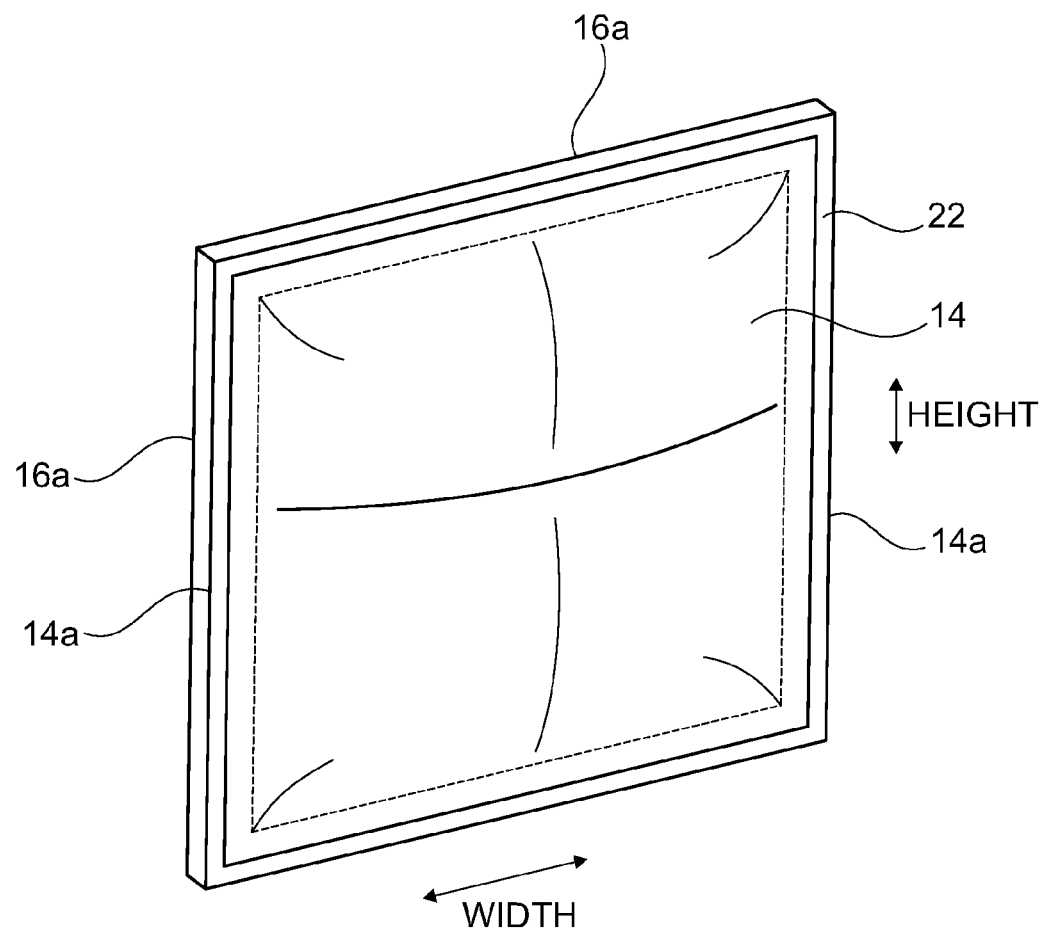
FIG. 3 is general view of an assembled thermal insulation panel.

FIG. 3 illustrates the exterior of a panel 10 and further highlights the curved nature of the outer layers 14, 16. The periphery and vacuum seal 14a, 16a and 25 are also clearly visible. The reader will note that the outer layers are preferably curved in two dimensions which form the width and height of the panel itself. Such forming may be by way of blow moulding or pressing but is preferably such as to provide a self supporting concave inner profile to each outer layer prior to them being joined to their respective tension members. In operation this profile will flatten as the vacuum is created but it is this flattening in combination with the tensioning of the tension members 36, 38 which provides much of the rigidity in the present invention.

FIGS. 4 to 7 illustrate a further arrangement of the present invention which may well be of use for larger panel sizes. The arrangement includes the same basic components of inner and outer layers 14, 16, tension member 24 and panels 26, 28, thermal barrier 22, vacuum seal 24, vacuum outlet 30 and valve 31 and these components are not, therefore, described again herein. The reader will appreciate that all the options and arrangements described above in relation to the FIGS. 1 to 3 embodiment may applied equally to the arrangement of FIGS. 4 to 7. The difference with the arrangement of FIGS. 4 to 7 resides in the provision of multiple rather than singular concaved sections, as highlighted at 48 in FIG. 4 and the provision of ribs 50 which are attached thereto and best seen in FIGS. 5 and 6. A plurality of vacuum holes 29 are provided, at least one being provided into each pocket.

In the above arrangement the said first and second outer layers 14, 16 are joined to respective tension panels 26, 28 at a plurality of discrete locations 46 across a width W of said panel 10, thereby to form a plurality of discrete pockets (48).

Figure 6:
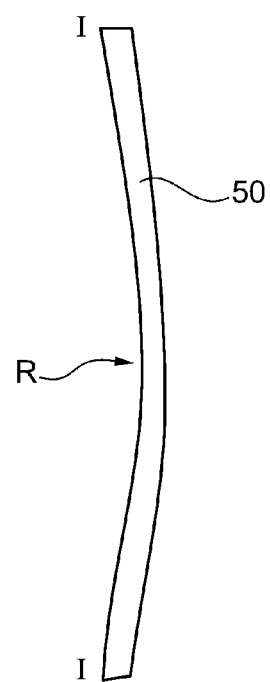
FIG. 6 is a side view of one of the ribs shown in FIG. 5 and illustrates the curvature applied thereto.
Figure 7:
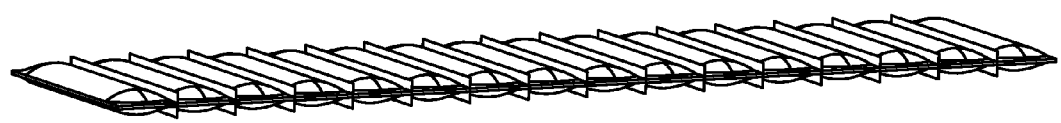
FIG. 7 is general view of an assembled panel as shown also in FIGS. 4 and 5.

Each of the external ribs 50 is joined to said outer layer 14, 16 along a length L thereof at each of said locations 46 at which said outer layers 14, 16 are joined to said tension panels 26, 28. The ribs 50 are each convex along their length as best seen in FIG. 6, for reasons that will become apparent later herein. The curvature of the ribs 50 is such as to accommodate a curvature of the associated skin. In an alternative arrangement the ribs 50 might simply have a curved inner surface which corresponds to the curvature of the associated layer and the outer surface may be substantially flat (not shown).

It will be appreciated that the first and second outer layers 14, 16 may be made from a number of materials so long as they lend themselves to forming into a generally concaved shape. Suitable materials include sheet metals such as aluminium, steel, stainless steel and the like, plastics—including reinforced plastics and glass-fibre and similar sheet materials. Such materials may be pressed into the desired concaved shape in a simple press or may be formed by thermal forming techniques in the case of plastics or laid up into the desired shape by moulding into a former if glass fibre or similar materials are employed. The same sheet like materials may be used for tension member 24 but any such materials selected should be able to accommodate and resist tensile loadings when the vacuum is established such as to ensure tension remains within the tension member after the vacuum has been sealed in. Certain plastics may not lend themselves to such use as they may relax after a period of time and thus reduce the tensile loading.

Figure 4:
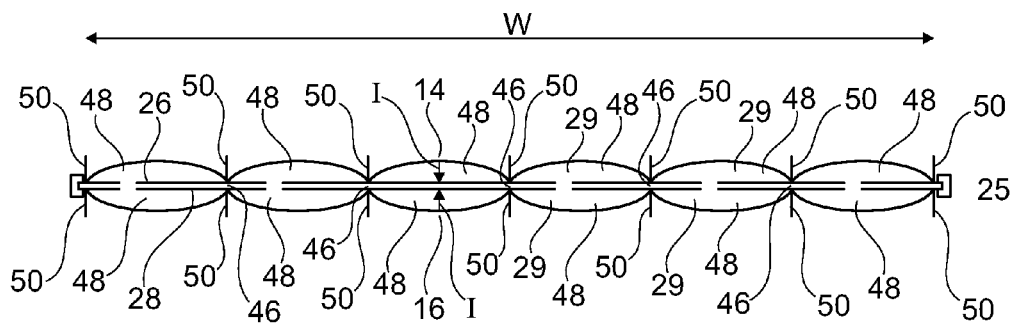
FIG. 4 is a cross-sectional view of an alternative form of insulation panel incorporating aspects of the present invention.
Figure 5:
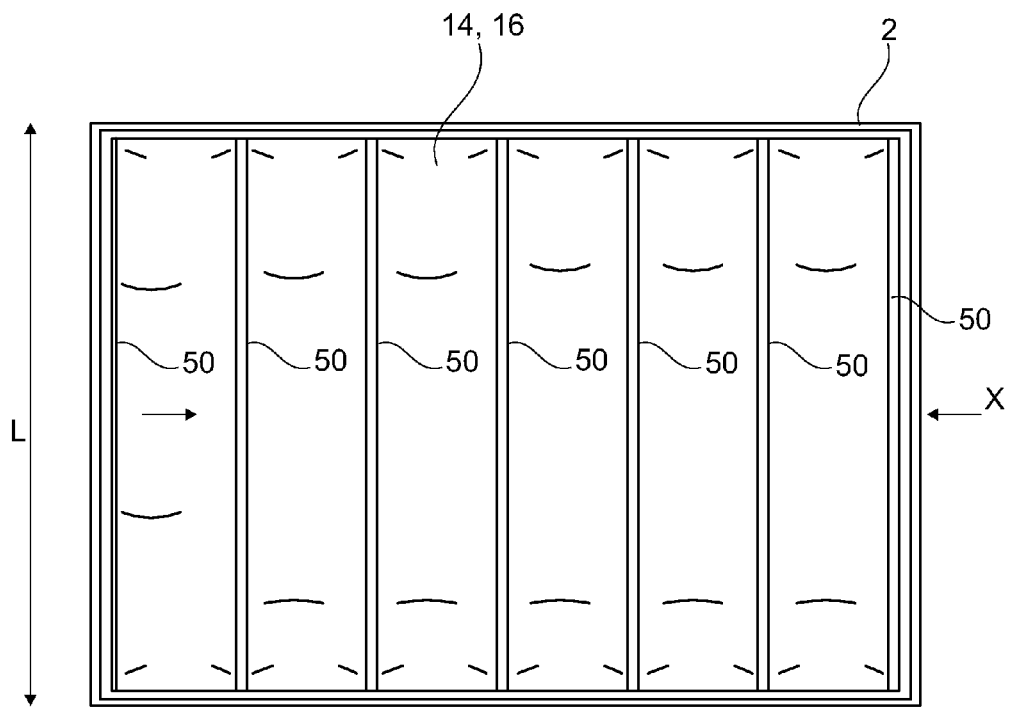
FIG. 5 is a frontal view of the panel shown in FIG. 4.

The strength of the above arrangements comes from pulling a partial vacuum within the panel 10 such as to cause the concaved inner and outer layers 14, 16 to be effectively sucked inwardly in the direction of arrows I in FIGS. 1 and 4. This motion causes the panel to expand slightly across its width W which in turn places a tensile loading onto the tension member 24 panels 26, 28. Sealing outlet 30 by closing valve 31 will maintain the vacuum and the tension in tension member 24 and the tension will create rigidity within the panel in the manner of a drum skin drawn tightly over a drum. This tension and strength is created without the use of internal members which pass load from one external outer layer 14 to the other 16 and this arrangement thus avoids one of the problems of the prior art which uses such internal members and which thereby creates an undesirable thermal transmission path. When the vacuum is pulled in the FIGS. 4 to 7 arrangement the same tensile loading is created but this time the loading is split between the ribs 50 such as to, in effect, create multiple zones of tension. Each concaved section in FIG. 4 will be sucked towards the associated tension panel 26, 28 in the manner described above and in relation to the FIG. 1 arrangement. However, the ribs 50 in the FIG. 4 arrangement will also act to resist the sucking in of the outer layers 14, 16 and provide further structural rigidity. It will be appreciated that the concave nature of the outer layers 14, 16 and the provision of the tension within the tension members 24 and ribs 50 greatly enhances the structural integrity and strength and thus creates a low weight, strong and durable thermal insulation panel. The use of a vacuum with no or little structure bridging the gap greatly enhances the thermal insulation efficiency relative to the prior art.

Not shown in the drawings but of use to the above would be mounting points on the outer periphery of the panel so as to allow the panel to be mounted within a frame or within a standard aperture in a building.

The invention claimed is:

1. A thermal insulation panel comprising:
   a. an outer casing having a first outer layer and a second outer layer and each having an outer periphery, and in which each of said first and second outer layers are curved having a concaved surface on an inner side;
   b. a thermal insulation barrier extending around an outer periphery between the first and the second outer layers;
   c. a vacuum seal joining the outer periphery of said first outer layer and the outer periphery of said second outer layer;
   d. a vacuum outlet;
   e. a vacuum outlet valve;
   f. a tension member comprising a pair of tension panels between said outer layers, said first tension panel extending between and being joined to the first outer layer at the periphery thereof and the second tension panel extending between and being joined to the second outer layer at the periphery thereof.

2. The thermal insulation panel as claimed in claim 1, in which each of said first and second tension panels comprise sheets and include outer peripheries and wherein said outer peripheries are joined to adjacent peripheries of said first and second outer layers respectively.

3. The thermal insulation panel as claimed in claim 2, in which each of said first and second outer layers comprise outwardly facing surfaces, and wherein said outwardly facing surfaces include a heat reflective surface.

4. The thermal insulation panel as claimed in claim 3, in which said vacuum seal is joined to each of said first and second outer layers by a weld.

5. The thermal insulation panel as claimed in claim 3, in which said vacuum seal is joined to each of said first and second outer layers by an adhesive bond.

6. The thermal insulation panel as claimed in claim 1, in which said tension panels include outwardly facing surfaces and inwardly facing surfaces and wherein said inwardly facing surfaces include a heat reflective surface.

7. The thermal insulation panel as claimed in claim 1, in which said tension panels include outwardly facing surfaces and inwardly facing surfaces and wherein one or more of said outwardly facing surfaces include a heat reflective surface.

8. The thermal insulation panel as claimed in claim 1, in which said vacuum seal comprises a metal foil.

9. The thermal insulation panel as claimed in claim 1, in which said thermal insulation barrier is selected from the materials: plastic, ceramic, rubber, wood.

10. The thermal insulation panel as claimed in claim 1, in which said first and second outer layers are joined to the respective tension panels at a plurality of locations across a width W of said panel, thereby to form a plurality of discrete pockets.

11. The thermal insulation panel as claimed in claim 10, including a plurality of external ribs, each rib being joined to said outer layers along a length L thereof at each of said locations at which said outer layers are joined to said tension panels.

12. The thermal insulation panel as claimed in claim 11, in which said ribs are convex along their length.

13. The thermal insulation panel as claimed in claim 1, in which said first and second outer layers are each joined to respective tension panels around the entire outer periphery thereof.

* * * * *